United States Patent [19]
Kleeberg

[11] 3,899,114
[45] Aug. 12, 1975

[54] SOLDERING IRON TIP AND METHOD OF FABRICATION

[75] Inventor: Gunther K. E. Kleeberg, Lexington, Mass.

[73] Assignee: M. M. Newman Corporation, Marblehead, Mass.

[22] Filed: Nov. 4, 1974

[21] Appl. No.: 520,677

[52] U.S. Cl. ................................................ 228/55
[51] Int. Cl.² .......................................... B23K 3/02
[58] Field of Search ............ 228/55, 25, 51, 52, 53, 228/54; 219/229, 236, 238, 239

[56] References Cited
UNITED STATES PATENTS
| | | | |
|---|---|---|---|
| 1,098,437 | 6/1914 | Hadaway | 219/238 |
| 1,372,778 | 3/1921 | Sands | 228/55 |
| 1,549,914 | 8/1925 | Guest | 228/55 |

FOREIGN PATENTS OR APPLICATIONS
| | | | |
|---|---|---|---|
| 828,004 | 2/1960 | United Kingdom | 219/238 |
| 207,215 | 1/1960 | Austria | 228/51 |

*Primary Examiner*—Al Lawrence Smith
*Assistant Examiner*—Margaret M. Joyce
*Attorney, Agent, or Firm*—Rowland V. Patrick

[57] ABSTRACT

A soldering iron tip has a split sleeve fabricated from sheet stock which is connected to a working element by a cup-shaped coupling joining the working element with the sleeve by a pressed radial fit between a head portion of the working element and the inner side surfaces of the coupling, providing an inexpensively manufactured replaceable tip which has good heat transfer properties.

4 Claims, 6 Drawing Figures

SOLDERING IRON TIP AND METHOD OF FABRICATION

This invention relates to soldering iron tips and more particularly to replaceable soldering iron tips adapted to be readily mounted with good heat transfer relationship on the heating element of a soldering iron.

Such tips are presently made by machining bar copper or other metal stock to shape the working end of the tip, and drill and slot its shank so that it can be resiliently telescoped over the heating element of the soldering iron and held there with a friction fit. An annular keeper may surround the slotted sleeve so that it can be slid upwardly in order to help maintain the friction fit. In such embodiments the entire tip element is made from single stock except for the keeper.

In accordance with the present invention, the tip is of multi-piece construction, but even so its manufacturing operations are less costly because it eliminates the long drilling operation and the long saw slotting operation and the deburring of the long slots inside the long hole.

This is accomplished by forming the support end of the tip from sheet stock bent into a 180° double split sleeve adapted to telescope over the heating element of the conventional soldering iron and then connecting the working element to this cylindrical slotted sleeve by seating the bottom end of the sleeve in a cup-shaped coupling and passing a headed end of the working element down through the sleeve into the coupling so that its head presses the walls of the sleeve into a radially outward press fit engagement with the upstanding wall of the coupling and its working end extends through an aperture in the bottom wall of the coupling.

A structure in accordance with the invention is shown in the accompanying drawings wherein.

Figure 5:
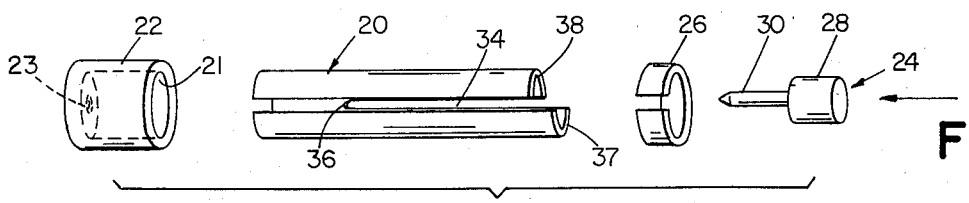

As best shown in FIG. 5, the soldering iron tip is comprised of four separate parts including a split hollow sleeve 20, an apertured cup-shaped coupling 22, a headed working element 24 and a split ring keeper 26.

The working element 24 has a head 28 and shank 30 and can be made on the automatic screw machine or cold headed from a rod 30a the diameter of the tip body.

Figure 3:
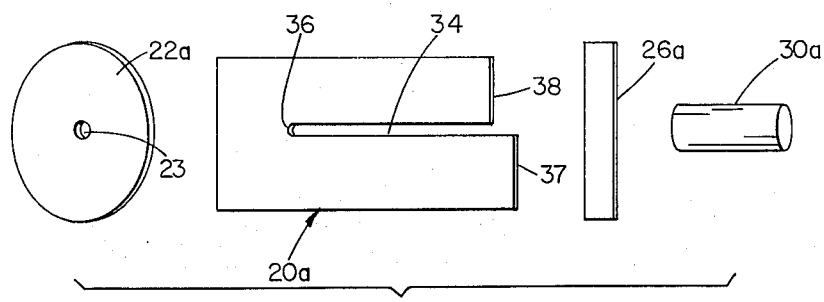
FIGS. 3, 4 and 5 illustrate progressive steps in the manufacture of the components of a soldering tip of the invention.
Figure 4:
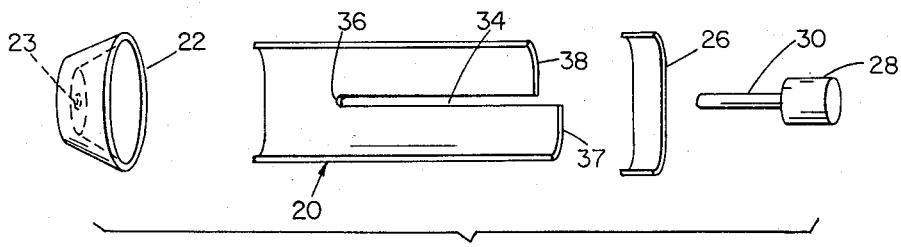

The sleeve 20 is made from strip stock 20a and has a longitudinal slot 34 shown as terminating at 36 (FIG. 3).

The cup-shaped coupling 22 can be produced in a progressive die from strip stock discs 22a or by eyelet machine process.

The right-hand outer end of the sleeve 20 is shown as cut-off in staggered relation with a longer leg 37 and a shorter leg 38 so, in small sizes, the opposite ends of the sleeve 20 may be distinguished by touch for assembly operator's convenience.

Figure 6:
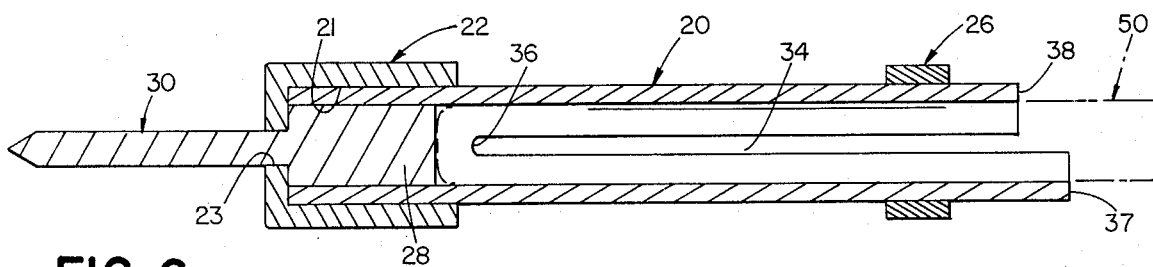
FIG. 6 is a cross-sectional view of the soldering tip.

FIG. 6 shows the assembly of the three parts 20, 22 and 24.

First the split sleeve 20 is inserted into the cup of the coupling 22. Then the element 24 is inserted into the inside of the sleeve and forced under pressure to the bottom of the coupling causing the sleeve 20 to be pressed against the cylindrical surface 21 of the coupling 22. The three parts are thus in intimate contact with each other with a radial pressed fit, as shown in FIG. 6, and with the shank 30 extending through an aperture 23 in the coupling. In such assembled form the juncture provides a good heat sink and B.T.U. storage for the tip to draw on during use.

The keeper 26 may be formed from stainless steel stock 26a and is slideable along the outside of the sleeve 20.

The working tip 24 may be formed of copper and the sleeve 20 and coupling 22 of aluminum.

Figure 1:
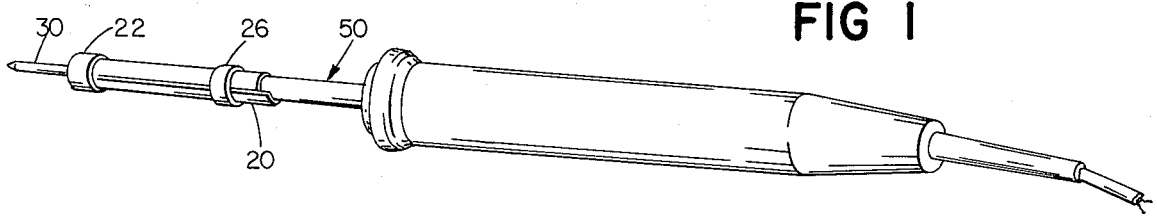
FIG. 1 is a perspective view of a soldering iron with a replaceable tip of the invention mounted thereon.
Figure 2:
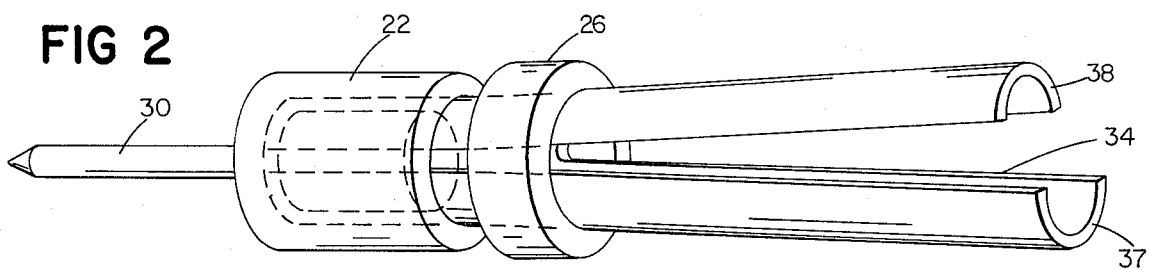
FIG. 2 is an enlarged perspective view of the tip separated from the soldering iron.

Because of the resilience afforded by the splits in the sleeve, the sleeve may be telescoped over the conventional heating element of a soldering iron and the keeper 26 moved from a position as in FIG. 2 towards the soldering iron to a position as shown in FIG. 6 to clamp the parts together. Good heat transfer contact is then maintained between the heating element 50 and the surrounding portions of the sleeve 20. In FIG. 2 the separation of the empty ends 37 and 38 of the sleeve 20 is exaggerated.

What is claimed is:

1. A soldering iron tip comprising
   a headed working element
   a split hollow sleeve, and
   an apertured cup-shaped coupling connecting said working element and said hollow sleeve together,
   the bottom end of said sleeve being seated against the side wall of said coupling and
   the working element being seated in said coupling inside of said sleeve with its shank extending through the bottom of said coupling and with the end of said sleeve locked between the head of the working element and the side wall of said coupling.

2. A soldering iron tip comprising
   a headed working element
   a split hollow cylindrical sleeve, and
   an apertured cup-shaped coupling connecting said working element and said hollow sleeve together,
   the bottom end of said sleeve being seated against the side wall of said coupling and
   the working element being seated in said coupling inside of said sleeve with its shank extending through the bottom of said coupling and with its head pressing the end of said sleeve radially outward in a press fit against the side wall of said coupling.

3. The method of fabricating a soldering iron tip comprising
   forming a hollow split sleeve from flat sheet stock,
   forming a working element having a top head, and
   assembling the sleeve and the working element together by placing the bottom end of the hollow sleeve in a cup-shaped recess of a coupling and passing the headed end of the working element down through said sleeve until it is seated in said cup-shaped recess with its side wall making a radially outward press fit locking the end of said hollow sleeve between the opposed side surfaces of said head and said coupling.

4. The method of fabricating a soldering iron tip which comprises
   forming a split hollow sleeve from flat sheet stock and connecting a headed working element to said sleeve by inserting the bottom end of said sleeve into a cup-shaped coupling and passing the headed end of said working element downwardly through the bore of said hollow sleeve and seating it in said cup-shaped coupling with its shank extending through an aperture in the bottom of said coupling and its head, said sleeve and said coupling pressed radially together in a friction fit.

* * * * *